(12) United States Patent
Koonce

(10) Patent No.: US 10,145,510 B2
(45) Date of Patent: Dec. 4, 2018

(54) MOBILE COMPRESSED GAS REFUELER

(71) Applicant: Luxfer-GTM Technologies, LLC, San Francisco, CA (US)

(72) Inventor: J. Michael Koonce, San Francisco, CA (US)

(73) Assignee: LUXFER-GTM TECHNOLOGIES, LLC, San Francisco, CA (US)

( * ) Notice: Subject to any disclaimer, the term of this patent is extended or adjusted under 35 U.S.C. 154(b) by 557 days.

(21) Appl. No.: 14/680,335

(22) Filed: Apr. 7, 2015

(65) Prior Publication Data

US 2015/0308622 A1 Oct. 29, 2015

Related U.S. Application Data

(60) Provisional application No. 61/978,059, filed on Apr. 10, 2014.

(51) Int. Cl.
*F17C 5/06* (2006.01)

(52) U.S. Cl.
CPC .......... *F17C 5/06* (2013.01); *F17C 2201/035* (2013.01); *F17C 2201/056* (2013.01); *F17C 2201/058* (2013.01); *F17C 2203/0604* (2013.01); *F17C 2203/0663* (2013.01); *F17C 2205/0103* (2013.01); *F17C 2205/0146* (2013.01); *F17C 2205/0157* (2013.01); *F17C 2205/0338* (2013.01); *F17C 2221/012* (2013.01); *F17C 2221/016* (2013.01); *F17C 2221/017* (2013.01); *F17C 2221/03* (2013.01); *F17C 2221/031* (2013.01); *F17C 2221/033* (2013.01); *F17C 2223/0123* (2013.01); *F17C 2223/035* (2013.01); *F17C 2223/036* (2013.01); *F17C 2225/0123* (2013.01); *F17C 2225/035* (2013.01); *F17C 2227/0164* (2013.01); *F17C 2227/042* (2013.01); *F17C 2265/06* (2013.01); *F17C 2265/065* (2013.01); *F17C 2270/0168* (2013.01); *Y02E 60/321* (2013.01)

(58) Field of Classification Search
CPC ........ F17C 2227/042; F17C 2227/0128; F17C 2227/0135; F17C 2227/0142; F17C 2227/0164; F17C 2205/0157
See application file for complete search history.

(56) References Cited

U.S. PATENT DOCUMENTS

| | | | | |
|---|---|---|---|---|
| 5,406,988 A * | 4/1995 | Hopkins | ................... | F17C 7/00 123/527 |
| 2013/0240080 A1* | 9/2013 | Pick | ........................ | B67D 7/04 141/4 |
| 2014/0261863 A1* | 9/2014 | Cohen | ....................... | F17C 5/06 141/4 |

* cited by examiner

*Primary Examiner* — Timothy L Maust
*Assistant Examiner* — Timothy P Kelly
(74) *Attorney, Agent, or Firm* — Dergosits & Noah LLP

(57) ABSTRACT

A fully contained, mobile, compressed natural gas (CNG), compressed breathing air, or other compressed gas refueling unit, and methods of use of said refueling unit, that use a pneumatically powered booster pump to provide a consistent, high pressure filling of CNG storage tanks without using an external power source.

18 Claims, 2 Drawing Sheets

MOBILE COMPRESSED GAS REFUELER

CROSS-REFERENCE

This disclosure claims priority from U.S. Provisional Patent Application No. 61/978,059, entitled Mobile Compressed Gas Refueler, filed Apr. 10, 2014, and fully incorporated by reference herein.

TECHNICAL FIELD

The present invention relates generally to a fully contained, mobile, compressed natural gas (CNG) compressed breathing air, or other compressed gas refueling unit, and methods of use of said refueling unit, that provide a consistent, high pressure filling of CNG storage tanks without using an external power source.

BACKGROUND

The growth of CNG combustion powered vehicles and equipment is placing increasing needs for new means to fill dedicated, high pressure fuel storage cylinders used to power CNG engines. Current technology mobile CNG refuelers generally operate using pressure equalization methods ("cascading") between the stationary storage and the target fill vessel, or using traditional gas compressors to provide continuous high pressure filling as the mobile CNG storage pressure decreases with each successive fill. The combustion driven compressor-based refueler can be run on the CNG itself or on other suitable fuels known in the art. However, the cascading strategy does not provide consistent high pressure output as the fixed storage is depleted and the corresponding pressure decreases. The prior art systems are also expensive and are often quite heavy, not lending themselves to all mobile applications.

Currently, most CNG powered engines have storage capabilities with a maximum storage pressure of 3,600 psig. As successive fills from the mobile refueler's storage bank are performed, the storage pressure in the mobile refueler's storage bank continues to decline. Prior art cascade filling methods do not provide any means to augment, or boost, the storage pressure to higher levels. As the pressure in the mobile refueler's storage tanks decreases below 3,600 psig, some means of increasing the pressure to 3,600 psig, such as for example, a compressor, is required.

Traditional compressors are often costly, require a relatively large footprint to be deployed, and are heavy. Additionally, traditional compressors require either external electrical power or some additional fuel storage if a combustion drive is used to power the compressor. However, in many locations where CNG powered equipment is operated, such as for example, locations that are remote or inaccessible, and/or not supplied with standard infrastructure ("stranded natural gas sites"), external power or compression equipment is not always available.

At many stranded natural gas sites, there is limited infrastructure to operate traditional compressors. Further, operating traditional compressors at such locations may not be economical due to low gas flow rates from the well. Additionally, steel tube trailers commonly used for CNG storage may find it hard to access the remote sites. Despite the growth of stationary CNG filling stations, there exists a growing need for portable filling equipment to refill CNG equipment storage tanks in more remote locations.

DETAILED DESCRIPTION

The embodiments of the present invention include a mobile, self-powered unit for the dispensing of compressed gases such as CNG, breathing air, or other high pressure gases. The mobile unit is used to perform remote filling of receiving tanks from on-board storage cylinders containing high pressure gas. The invention also provides for filling of the on-board storage bank of cylinders of the unit to high gas pressures from relatively low pressure gas sources such as remote well locations or flare gas streams. In the various embodiments described herein, the filling of external tanks such as vehicles or stationary ground tanks or the refilling of the on-board storage cylinders will be accomplished with a pneumatically powered booster pump without the need to use external electrical or hydraulic power.

The apparatus and methods according to the present invention address the problems of filling of CNG storage tanks from on-board storage cylinders of the mobile unit containing high pressure gas without requiring the use compressors or external power sources. The apparatus and methods according to the present invention also address recovering natural gas from remote well locations and flare gas streams without requiring the use compressors or external power sources. A mobile, self-contained, mobile unit to fuel and/or recover and store natural gas can be transported to the locations requiring natural gas, such as vehicles, pipelines, industrial burner, and electrical power generation, or to remote or stranded sites having sources of natural gas. At remote or stranded sites, the proposed mobile unit can be operated in reverse and the pressure from the gas well can be used to power the booster pump and fill the on-board storage cylinders of the mobile unit, providing an inexpensive, flexible and mobile platform to move CNG from the well site to a point of use.

The mobile compressed gas refueling unit according to the present invention incorporates the use of a fully integrated system consisting of the multiple element, high pressure, light weight, gas storage system, made up of type III or IV composite cylinders, also known as "the gas transport module", one or more pressure regulators; one or more pneumatic driven booster pump; and a dispenser assembly.

The method to perform remote filling of receiving tanks from an on-board storage cylinders containing high pressure gas provides at least the following advantages over traditional methods:

Use of inexpensive compression method.

Relatively inexpensive to maintain and operate

Relatively light weight for mobile applications allowing for greater CNG payloads and the ability to move larger volumes of dispensable CNG with smaller more cost effective vehicles.

Figure 1:
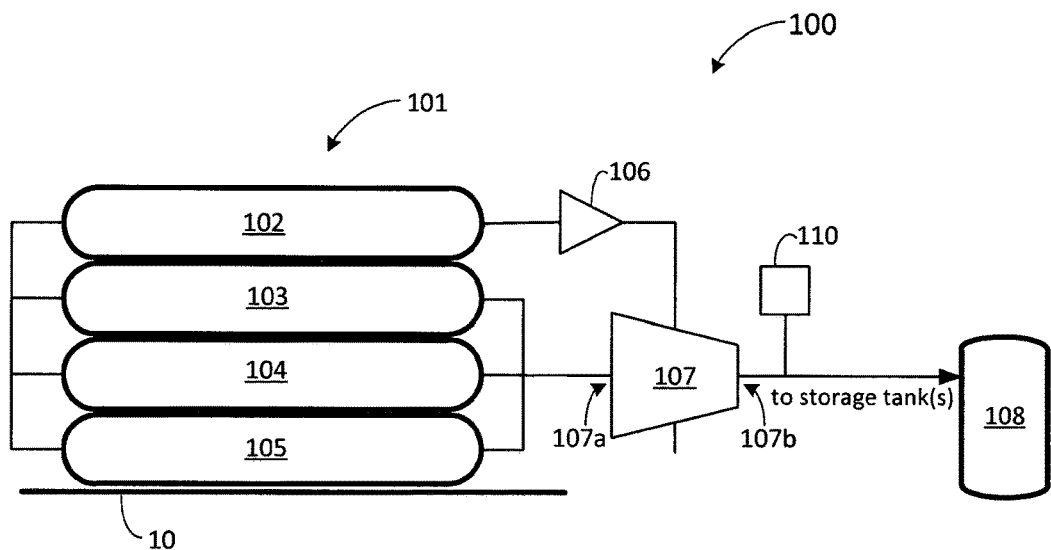
FIG. 1 illustrates a mobile compressed gas refueler according to an embodiment of the invention.

FIG. 1 illustrates a mobile compressed gas refueler 100 comprising a gas transport module 101 which is placed on a support platform 10. According to an embodiment of the invention, platform 10 can be a mobile platform or trailer. According to an embodiment of the invention, gas transport module 101 comprises a plurality of high pressure, light weight, type III or IV composite gas cylinders 102-105, which may be interconnected through a common manifolded piping configuration to a single fill and/or discharge port.

According to an embodiment of the invention, cylinder 102 is isolated from cylinders 103-105 by a pressure valve (not shown). In other embodiments, more than one cylinder may be isolated by pressure valve or valves, or by other means known in the art, from the rest of the cylinders of module 101. The high pressure gas of the isolated cylinder 102 is directed to a high flow pressure regulator 106.

Regulator 106 reduces the pressure from higher pressure gas sources such as the on-board storage cylinder 102 having storage pressures ranging up to 6,520 psig to approximately 100-150 psig. In other embodiments, the high pressure gas source may be natural gas wells that can have varying pressures of 100 psig to 5,000 psig. The gas from regulator 106 is piped to a booster pump 107 to pneumatically power pump 107 without requiring the use compressors or external power sources. The pneumatically powered booster pump 107 increases gas pressure to a higher pressure than the pressure in the targeted fill tank. Gas from cylinders 103-105 is directed to inlet 107a of the booster pump 107. The outlet 107b of the booster pump 107 is piped to storage tanks 108, and the gas flowing from outlet 107b is used to fill storage tank 108. As the gas supply within non-isolated cylinders 103-105 is depleted, and the pressure within these cylinders declines, the booster pump 107 provides consistently high pressure to discharge the remaining gas from the storage cylinders 103-105 to storage tanks 108. Booster pump 107 "boosts" the pressure to compensate for declining pressures in the on-board storage cylinders as the stored gas is removed from on-board storage cylinders with each subsequent dispensing.

Figure 2:
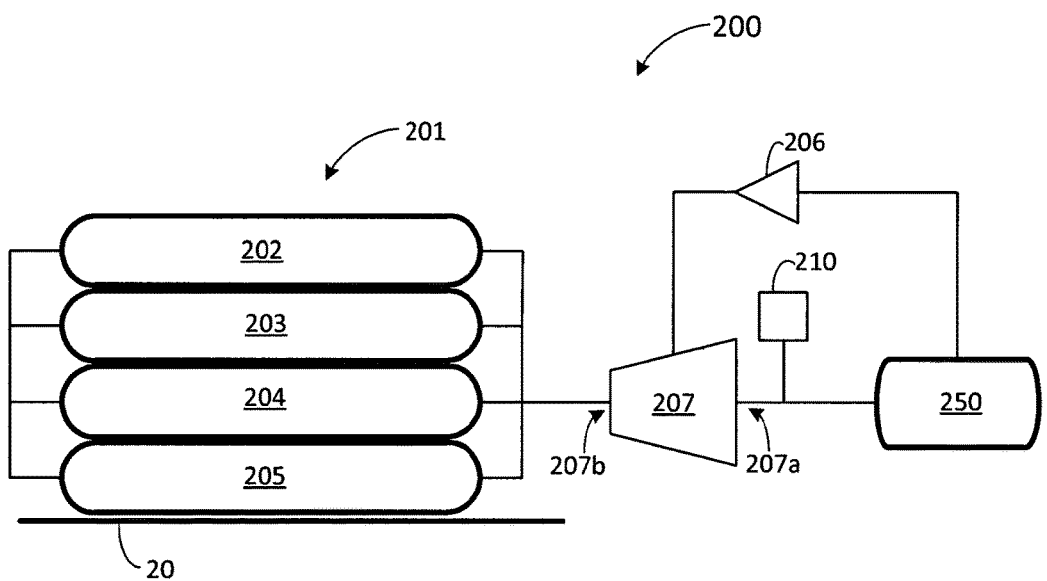
FIG. 2 illustrates a mobile compressed gas refueler according to an embodiment of the invention.
Figure 3:
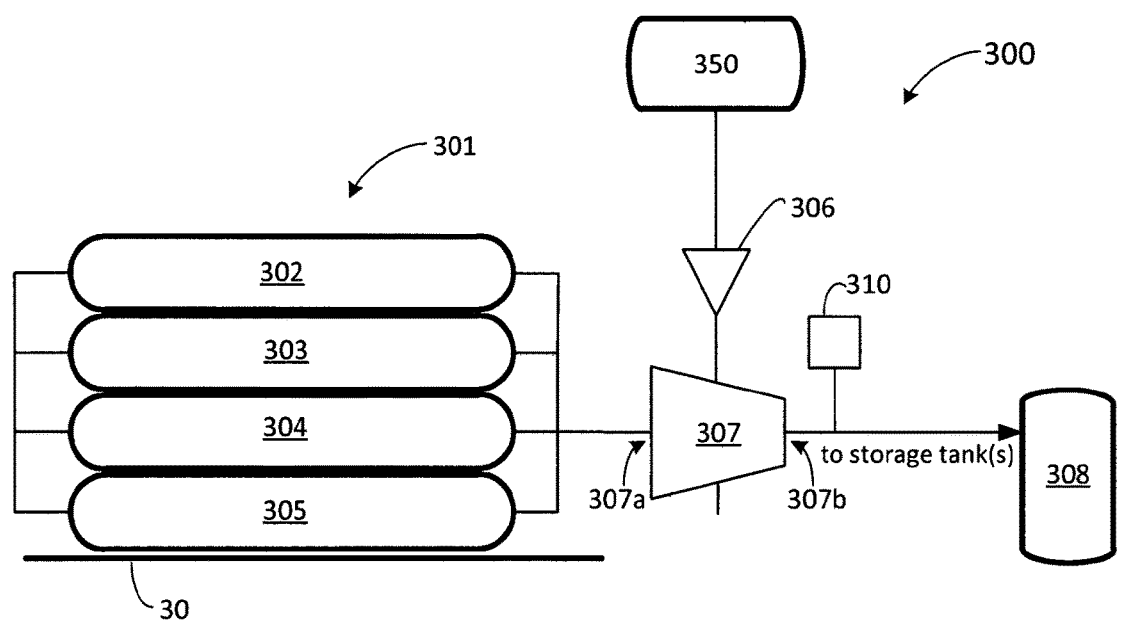
FIG. 3 illustrates a mobile compressed gas refueler according to an embodiment of the invention.

A commercially-available pneumatically powered booster pump 107 consists of two sections: the pneumatic drive section and the compression section. Embodiments of the invention include at least three possible sources of pneumatic pressure to drive booster pump 107. The first source of pneumatic pressure may come from high pressure, stored gas contained within one or more of the on-board storage cylinders, as illustrated in FIG. 1. The second alternative source of pneumatic pressure may come from an external source of compressed natural gas contained in an underground well, as illustrated in FIG. 2. The third alternative source of pneumatic pressure may come from an external source of either compressed air or from compressed natural gas contained in an external source such as a storage tank, as illustrated in FIG. 3.

Gas used to drive the pneumatic booster pump should be vented safely away from the operator. Alternatively, it may be used as fuel gas to power external devices. As an embodiment of this invention, the self contained refueling unit may incorporate a commercially available dispenser 110 to meter the quantity of gas dispensed. The dispenser will be powered by a battery bank either contained within the trailer or from the 12V current available from a standard electrical trailer connection.

FIG. 2 illustrates the filling of the on-board cylinder storage bank of a mobile compressed gas refueler 200 from external gas source such as a stranded natural gas well, flare gas stream, or other stationary gas storage vessel(s). These gas sources do not typically have sufficient pressure to fill the on-board cylinder storage bank to its maximum storage pressure.

As shown in FIG. 2, a mobile compressed gas refueler 200 comprises a gas transport module 201 placed on a support platform 20. According to an embodiment of the invention, platform 20 can be a mobile platform or trailer. Gas transport module 201 comprises a plurality of high pressure, light weight, type III or IV composite gas cylinders 202-205, which may be interconnected through a common manifolded piping configuration to a single fill and/or discharge port.

Gas from external gas source 250 is directed to a high flow pressure regulator 206. Regulator 206 reduces the pressure from a high pressure gas source such as natural gas wells that can have varying pressures of 100 psig to 5,000 psig, to approximately 100-150 psig. The gas from regulator 206 is piped to a booster pump 207 and is used to pneumatically power pump 207 without requiring the use compressors or external power sources. Gas from source 250 is directed to inlet 207a of the booster pump 207. The outlet 207b of the booster pump 207 is piped to on-board storage tanks 202-205 and is used to fill the on-board storage cylinder bank 202-205 from gas source 250 to a desired pressure.

FIG. 3 illustrates the filling of CNG storage tanks from on-board storage cylinders of the mobile gas refueler where the source of pneumatic pressure to drive the booster pump comes from an external source of either compressed air or compressed natural gas contained in an external source such as a storage tank.

As shown in FIG. 3, a mobile compressed gas refueler 300 comprises a gas transport module 301 placed on a support platform 30. According to an embodiment of the invention, platform 30 can be a mobile platform or trailer. Gas transport module 301 comprises a plurality of high pressure, light weight, type III or IV composite gas cylinders 302-305, which may be interconnected through a common manifolded piping configuration to a single fill and/or discharge port.

Gas from external high pressure gas source 350 is directed to a high flow pressure regulator 306. Regulator 306 reduces the pressure from high pressure gas source 350 to approximately 100-150 psig. The gas from regulator 306 is piped to a booster pump 307 and is used to pneumatically power pump 307 without requiring the use compressors or external power sources. Gas from cylinders 303-305 is directed to inlet 307a of the booster pump 307. The outlet 307b of the booster pump 307 is piped to storage tanks 308, and the gas flowing from outlet 107b is used to fill storage tank 308.

Detailed embodiments are disclosed herein with reference to the accompanying drawings. It should be understood that the disclosed embodiments are merely exemplary of the disclosed subject matter, which may be embodied in various forms. Therefore, specific structural and functional details disclosed herein are not to be construed as limiting, but merely as a basis for the claims and as a representative basis for teaching the subject matter to one skilled in the art. Various embodiments may be readily combined, without departing from the scope or spirit of the present disclosure.

The invention claimed is:

1. A method for dispensing gas, the method comprising:
   a) providing a mobile compressed gas refueling apparatus having:
      a support platform;
      a plurality of storage tanks disposed on said platform, said plurality of storage tanks interconnected with a piping system; a pressure regulator;
      a booster pump having an inlet and an outlet, said booster pump powered by gas from a first gas source; and
      a dispenser assembly;
   b) using the pressure regulator, adjusting a gas pressure of gas from the first gas source;
   c) using the gas from the first gas source at the adjusted gas pressure to power the booster pump;
   d) connecting the booster pump inlet to a second gas source; and, e) dispensing by the booster pump outlet high pressure gas from the second gas source to one or more target storage tanks.

2. The method of claim 1 wherein said high pressure gas is selected from a group consisting of compressed natural gas, breathing air, helium, argon, nitrogen, hydrogen, compressed hydrocarbons and mixtures thereof.

3. The method of claim 1 wherein the gas pressure is adjusted downward by the pressure regulator to between 100 psig and 150 psig.

4. The method of claim 1, wherein:
one or more of said plurality of storage tanks are isolated from the plurality of storage tanks and the first gas source includes the one or more isolated storage tanks;
the second gas source includes one or more of a remaining set of storage tanks from said plurality of storage tanks, the remaining set of storage tanks not including the one or more isolated storage tanks;
the one or more target storage tanks include an external storage tank; and
the dispensing step includes dispensing, by the booster pump outlet, high pressure gas through the dispenser assembly to the external storage tank.

5. The method of claim 4 wherein said high pressure gas is selected from group consisting of compressed natural gas, breathing air, helium, argon, nitrogen, hydrogen, compressed hydrocarbons and mixtures thereof.

6. The method of claim 4 wherein the gas pressure is adjusted downward by the pressure regulator to between 100 psig and 150 psig.

7. The method of claim 1, wherein:
the first gas source includes an external gas source;
the second gas source includes one or more of said plurality of storage tanks;
the one or more target storage tanks include an external storage tank; and
the dispensing step includes dispensing, by the booster pump outlet, high pressure gas through the dispenser assembly to the external storage tank.

8. The method of claim 7 wherein said high pressure gas is selected from group consisting of compressed natural gas, breathing air, helium, argon, nitrogen, hydrogen, compressed hydrocarbons and mixtures thereof.

9. The method of claim 7 wherein the gas pressure is adjusted downward by the pressure regulator to between 100 psig and 150 psig.

10. The method of claim 1, wherein:
the first gas source includes an external gas source;
the second gas source includes the external gas source;
the one or more target storage tanks include one or more of the plurality of storage tanks;
the connecting step includes connecting the booster pump inlet to the external gas source; and
the dispensing step includes dispensing, by the booster pump outlet, high pressure gas to the one or more of the plurality of storage tanks.

11. The method of claim 10 wherein said high pressure gas is selected from group consisting of compressed natural gas, breathing air, helium, argon, nitrogen, hydrogen, compressed hydrocarbons and mixtures thereof.

12. The method of claim 10 wherein the gas pressure is adjusted downward by the pressure regulator to between 100 psig and 150 psig.

13. A mobile compressed gas refueling system comprising:
a) a support platform;
b) one or more storage tanks disposed on said platform, said one or more storage tanks interconnected with a piping system;
c) a pressure regulator having a regulator inlet and a regulator outlet, the regulator inlet connectable to a first gas source, the pressure regulator configured to provide gas from the regulator inlet to the regulator outlet and at a regulated pressure;
d) a booster pump configured to be powered by gas from the regulator outlet at the regulated pressure, the booster pump having a pump inlet and a pump outlet, the pump inlet connectable to a second gas source; and,
e) a dispenser assembly connected to the pump outlet.

14. The system according to claim 13 wherein the on-platform storage tanks comprise multiple composite, type III or type IV cylinders with maximum storage pressure ranging from 3,600 psig to 6,520 psig.

15. The system according to claim 13 wherein said support platform is a mobile support platform.

16. The system according to claim 13 wherein said support platform is a trailer.

17. The system according to claim 13, wherein:
at least one storage tank is isolated from the one or more storage tanks; and
the first gas source includes the at least one isolated storage tanks.

18. The system according to claim 13, wherein:
the first gas source includes an external gas source.

* * * * *